United States Patent
Nandiwada et al.

(10) Patent No.: US 7,974,988 B2
(45) Date of Patent: Jul. 5, 2011

(54) SYSTEM AND METHOD FOR CROSS-CARRIER MOBILE DEVICE CAPABILITY DISCOVERY

(75) Inventors: Srinivasarao Nandiwada, Natick, MA (US); Eswar Priyadarshan, West Roxbury, MA (US); Krishnamoorthy Dhandapani, Kerala (IN); George Bukow, West Newbury, MA (US); Kenneth Lo, Quincy, MA (US)

(73) Assignee: Syniverse ICX Corporation, Tampa, FL (US)

( * ) Notice: Subject to any disclaimer, the term of this patent is extended or adjusted under 35 U.S.C. 154(b) by 100 days.

(21) Appl. No.: 11/710,474

(22) Filed: Feb. 26, 2007
(Under 37 CFR 1.47)

(65) Prior Publication Data
US 2008/0147592 A1      Jun. 19, 2008

Related U.S. Application Data

(60) Provisional application No. 60/776,967, filed on Feb. 24, 2006.

(51) Int. Cl.
*G06F 17/30* (2006.01)
(52) U.S. Cl. ........ 707/791; 707/802; 707/822; 707/828; 370/310; 455/400; 709/230
(58) Field of Classification Search .......... 707/600–831; 709/230–237; 370/310–400; 455/400–466
See application file for complete search history.

(56) References Cited

U.S. PATENT DOCUMENTS

| | | |
|---|---|---|
| 5,309,257 A | 5/1994 | Bonino et al. |
| 5,347,600 A | 9/1994 | Barnsley et al. |
| 5,548,789 A | 8/1996 | Nakanura |
| 5,613,017 A | 3/1997 | Rao et al. |
| 5,781,901 A | 7/1998 | Kuzma |
| 5,826,023 A | 10/1998 | Hall et al. |
| 5,860,074 A | 1/1999 | Rowe et al. |
| 5,883,640 A | 3/1999 | Hsieh et al. |
| 5,896,502 A | 4/1999 | Shieh et al. |
| 5,903,723 A | 5/1999 | Beck et al. |

(Continued)

FOREIGN PATENT DOCUMENTS

DE       19934787 A1    2/2001

(Continued)

OTHER PUBLICATIONS

USA Today, "SportsML Computer Language Streamlines Sports Scores," posted Nov. 7, 2002, downloaded from the Internet: http://www.usatoday.com/tech/news/techinnovations/2002-11-07-sports-ml_x.htm, pp. 1-2.

(Continued)

*Primary Examiner* — Isaac M Woo
(74) *Attorney, Agent, or Firm* — Blakely, Sokoloff, Taylor & Zafman, LLP; Judith A. Szepesi

(57) ABSTRACT

A system and method for cross-carrier mobile device capability discovery. According to an embodiment, a content delivery platform receives an identifier associated with a mobile computing device of a user, identifies a wireless carrier associated with the mobile computing device based on the received identifier, and detects one or more media capabilities supported by the user's mobile computing device for delivering content to the user's mobile computing device based at least in part on media capabilities supported by the identified carrier.

18 Claims, 5 Drawing Sheets

U.S. PATENT DOCUMENTS

| | | | |
|---|---|---|---|
| 5,917,965 | A | 6/1999 | Cahill et al. |
| 5,956,044 | A | 9/1999 | Giorgianni et al. |
| 6,016,520 | A | 1/2000 | Facq et al. |
| 6,072,598 | A | 6/2000 | Tso |
| 6,072,902 | A | 6/2000 | Myers |
| 6,081,883 | A | 6/2000 | Popelka et al. |
| 6,101,320 | A | 8/2000 | Schuetze et al. |
| 6,125,201 | A | 9/2000 | Zador |
| 6,141,686 | A | 10/2000 | Jackowski et al. |
| 6,161,140 | A | 12/2000 | Moriya |
| 6,163,626 | A | 12/2000 | Andrew |
| 6,167,441 | A | 12/2000 | Himmel |
| 6,195,696 | B1 | 2/2001 | Baber et al. |
| 6,198,941 | B1 | 3/2001 | Aho et al. |
| 6,202,097 | B1 | 3/2001 | Foster et al. |
| 6,256,666 | B1 | 7/2001 | Singhal |
| 6,275,869 | B1 | 8/2001 | Sieffert et al. |
| 6,278,449 | B1 | 8/2001 | Sugiarto et al. |
| 6,289,375 | B1 | 9/2001 | Knight et al. |
| 6,300,947 | B1 | 10/2001 | Kanevsky |
| 6,311,215 | B1 | 10/2001 | Bakshi et al. |
| 6,330,068 | B1 | 12/2001 | Matsuyama |
| 6,330,073 | B1 | 12/2001 | Sciatto |
| 6,334,126 | B1 | 12/2001 | Nagatomo et al. |
| 6,341,316 | B1 | 1/2002 | Kloba et al. |
| 6,351,547 | B1 | 2/2002 | Johnson et al. |
| 6,351,568 | B1 | 2/2002 | Andrew |
| 6,360,252 | B1 | 3/2002 | Rudy et al. |
| 6,385,772 | B1 | 5/2002 | Courtney |
| 6,389,460 | B1 | 5/2002 | Stewart et al. |
| 6,411,685 | B1 | 6/2002 | O'Neal |
| 6,421,733 | B1 | 7/2002 | Tso et al. |
| 6,438,576 | B1 | 8/2002 | Huang et al. |
| 6,441,913 | B1 | 8/2002 | Anabuki et al. |
| 6,449,658 | B1 | 9/2002 | Lafe et al. |
| 6,457,044 | B1 | 9/2002 | Iwazaki |
| 6,473,794 | B1 | 10/2002 | Guheen et al. |
| 6,480,853 | B1 | 11/2002 | Jain |
| 6,490,675 | B1 | 12/2002 | Sugiura |
| 6,493,758 | B1 | 12/2002 | McLain |
| 6,505,236 | B1 | 1/2003 | Pollack |
| 6,509,910 | B1 | 1/2003 | Agarwal et al. |
| 6,592,629 | B1 | 7/2003 | Cullen et al. |
| 6,598,076 | B1 | 7/2003 | Chang et al. |
| 6,724,721 | B1 | 4/2004 | Cheriton |
| 6,734,994 | B2 | 5/2004 | Omori |
| 6,742,043 | B1 | 5/2004 | Moussa et al. |
| 6,779,042 | B1 | 8/2004 | Kloba et al. |
| 6,925,595 | B1 | 8/2005 | Whitledge et al. |
| 7,054,905 | B1 | 5/2006 | Hanna et al. |
| 7,310,612 | B2 | 12/2007 | McQueen et al. |
| 7,593,686 | B1 * | 9/2009 | Knoop .......... 455/3.04 |
| 7,701,969 | B2 * | 4/2010 | Carrigan et al. .......... 370/466 |
| 2001/0049648 | A1 | 12/2001 | Naylor et al. |
| 2001/0054075 | A1 | 12/2001 | Miyanaga |
| 2002/0016818 | A1 | 2/2002 | Kirani et al. |
| 2002/0116531 | A1 | 8/2002 | Chu |
| 2002/0120693 | A1 | 8/2002 | Rudd et al. |
| 2002/0151283 | A1 | 10/2002 | Pallakoff |
| 2002/0169823 | A1 | 11/2002 | Colombe et al. |
| 2003/0028563 | A1 | 2/2003 | Stutz et al. |
| 2003/0093565 | A1 | 5/2003 | Berger et al. |
| 2003/0115277 | A1 | 6/2003 | Watanabe et al. |
| 2003/0126136 | A1 | 7/2003 | Omoigui |
| 2003/0181213 | A1 * | 9/2003 | Sugar et al. .......... 455/454 |
| 2003/0188039 | A1 | 10/2003 | Liu et al. |
| 2004/0078304 | A1 | 4/2004 | Gabbard et al. |
| 2004/0117731 | A1 | 6/2004 | Blyashov |
| 2004/0162818 | A1 | 8/2004 | Shaw |
| 2004/0258063 | A1 | 12/2004 | Raith et al. |
| 2005/0193341 | A1 | 9/2005 | Hayward et al. |
| 2006/0053227 | A1 | 3/2006 | Ye et al. |
| 2006/0100978 | A1 * | 5/2006 | Heller et al. .......... 707/1 |
| 2006/0190616 | A1 | 8/2006 | Mayerhofer et al. |

FOREIGN PATENT DOCUMENTS

| | | |
|---|---|---|
| DE | 10050172 A1 | 4/2001 |
| EP | 0763943 A2 | 3/1997 |
| EP | 811939 A2 | 12/1997 |
| EP | 0950969 A2 | 10/1999 |
| EP | 0992922 A2 | 4/2000 |
| EP | 1109371 A2 | 6/2001 |
| EP | 1109372 A2 | 6/2001 |
| WO | WO 9749252 A2 | 12/1997 |
| WO | WO9843177 A1 | 10/1998 |
| WO | WO 99/60793 A1 | 11/1999 |
| WO | PCT/GB00/01962 A1 | 11/2000 |
| WO | WO 00/75859 A1 | 12/2000 |
| WO | PCT/SE00/00807 A1 | 1/2001 |
| WO | PCT/KR01/01323 A1 | 2/2002 |

OTHER PUBLICATIONS

IPTC, "NewsML 1.2 Guidelines v 1.00," downloaded from the Internet: http://www.newsml.org/IPTC/NewsML/1.2/documentation/NewsML_1.2-doc-Guidelines_1.00.pdf, pp. 1-97.

USA Today, "SportsML Computer Language Streamlines Sports Scores," posted Nov. 7, 2002, downloaded from the Internet: http://www.usatoday.com/tech/news/techinnovations/2002-11-07-sports-ml_x.htm, pp. 1-2.

IPTC, "NewsML 1.2 Guidelines v 1.00," downloaded from the Internet: http://www.newsml.org/IPTC/NewsML/1.2/documentation/NewsML_1.2-doc-Guidelines_1.00.pdf, pp. 1-97.

The International Application No. PCT/US07/04868, International Preliminary Report and the Written Opinion, 11 pages.

Reynolds, Franklin, et al., "Composite Capability/Preference Profiles (CC/PP): A user side framework for content negotiation," Jul. 27, 1999, pp. 2-10. (www.w3.org/TR/NOTE-CCPP).

Joshi, Anupam, "On Disconnected Browsing of Distributed Information," Seventh International Workshop on Research Issues in Data Engineering, 1997 Proceedings, Birmingham, UK, Apr. 7-8, 1997, IEEE, pp. 101-107.

International Search Report, May 11, 2001, for International Application No. PCT/US01/06415.

Internet Standard IETF RFC Document 2616—Hypertext Transfer Protocol, Section 12—Content Negotiation and Section 14—Accept, Section 14.43—User Agent, 1999.

International Application No. PCT/US2007/04869, The International Preliminary Report and the Written Opinion, 10 pages.

* cited by examiner

SYSTEM AND METHOD FOR CROSS-CARRIER MOBILE DEVICE CAPABILITY DISCOVERY

CROSS REFERENCE TO RELATED APPLICATIONS

This application claims the benefit under 35 U.S.C. §119(e) of U.S. Provisional Application No. 60/776,967, filed Feb. 24, 2006, which is hereby incorporated by reference in its entirety.

BACKGROUND OF THE INVENTION

Media capabilities supported by mobile computing devices, such as those that receive wireless service and display content delivered via that service, and the wireless carriers that provide their service, are becoming increasingly diverse and rich. For example, the following media delivery methods and types are generally available:
MMS (Multimedia Messaging Service)—video+txt
MMS (Multimedia Messaging Service)—image+txt
WAP (Wireless Application Protocol)—video+txt/image+txt
SMS (Short Message Service )—txt alerts only However, different wireless carriers support different media delivery methods, and different mobile devices support different types of displayable media. Thus, it is quite difficult for content providers, especially those not affiliated with carriers, to know whether the content they provide can even be displayed by users' mobile devices, much less in a format appropriate to the device's capabilities.

Accordingly, there is a need in the art for a system and method to provide displayable content to users' mobile devices with more certainty.

DETAILED DESCRIPTION

The present invention addresses the uncertainty of providing displayable content to a user's mobile device by using knowledge of media capabilities supported by the device's carrier to detect the devices' media capabilities.

A carrier specific sequence of events enables a content delivery platform to determine the most rich media type (e.g., SMS/MMS/Video) and delivery method (e.g., SMS/WAP Push/MMS) for each mobile device user based upon applicable carrier policies and network capabilities, as well as the mobile device's make and model. Once captured, this information is saved to a participating customer capabilities database, which can be updated automatically if the platform detects a newer mobile device model.

Figure 1:
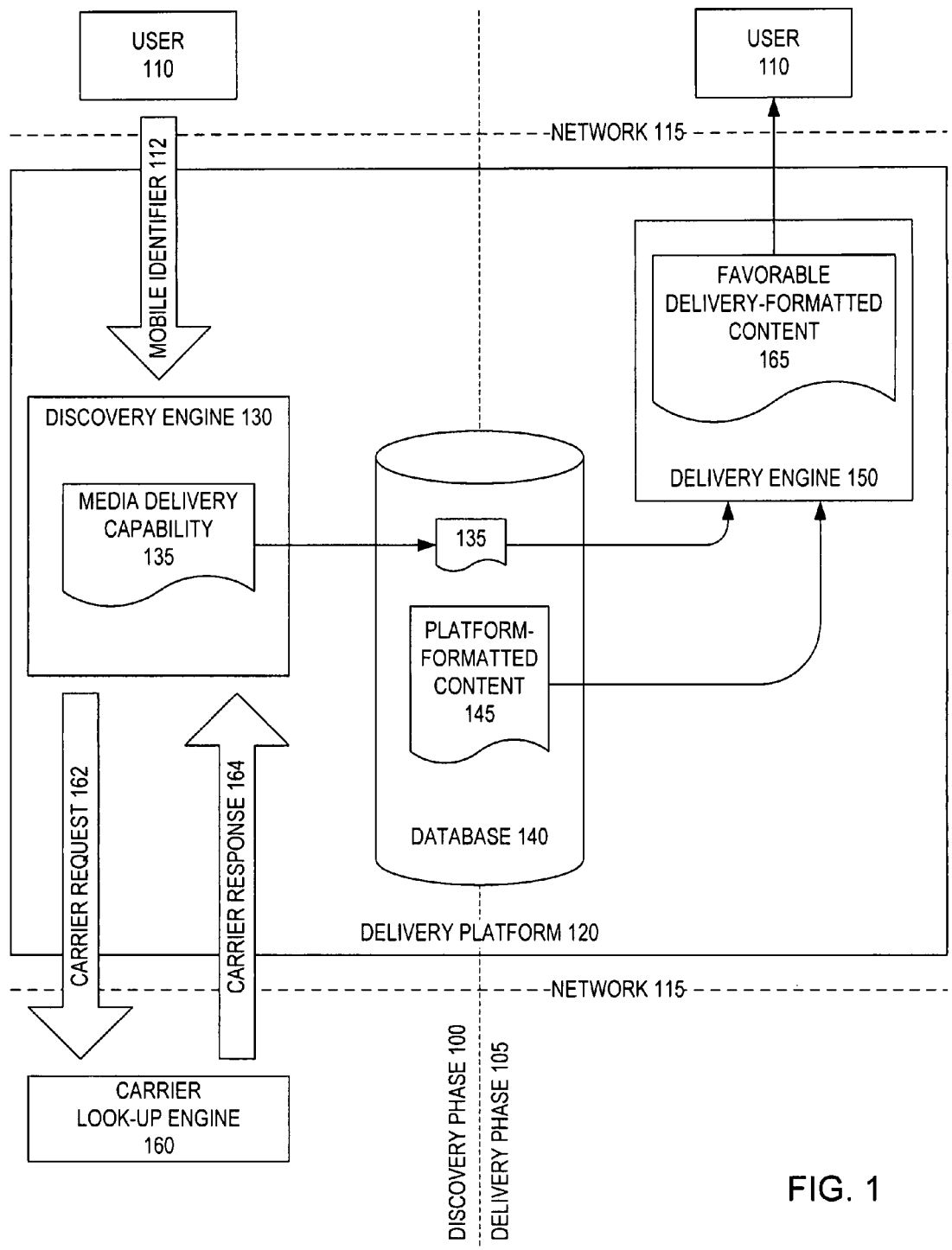
FIG. 1 is a block diagram that depicts a system for cross-carrier mobile device capability discovery in accordance with an embodiment of the present invention.
Figure 2:
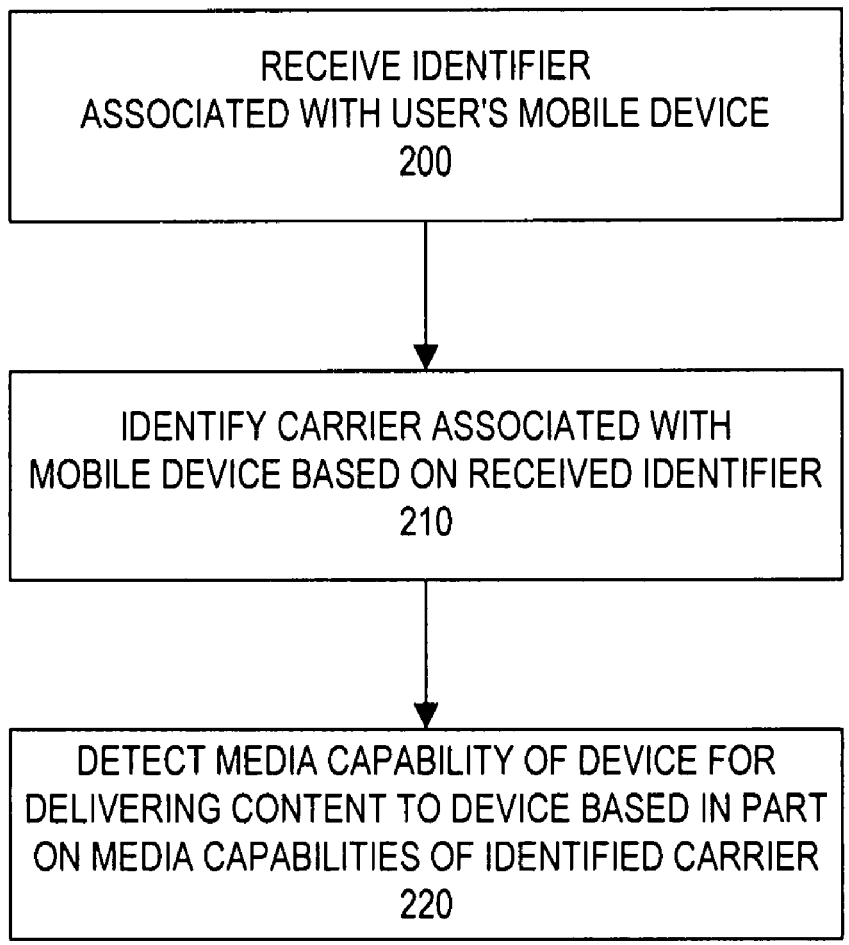
FIG. 2 is a flow chart that depicts a process for cross-carrier mobile device capability discovery in accordance with an embodiment of the present invention.

FIG. 1 depicts a content distribution system in accordance with an embodiment of the present invention. The delivery platform (120) upon which the content distribution system is based includes a discovery engine 130, database (140), and delivery engine (150). FIG. 2 describes a process associated with the discovery phase (100) of the content distribution system, and FIGS. 3-4 describe carrier specific processes for detecting the media capability of a mobile device.

In the discovery phase (100), the delivery platform (120) receives (step 200) an identifier (112) associated with a mobile computing device of a user (110) across a network (115), such as a telephone number, and issues a carrier request (162) across the network (115) to a look-up engine (160) to identify (210) the wireless carrier associated with the mobile computing device based on the received identifier.

Upon receiving the carrier response (164) with the carrier information, the discovery engine (130) detects (220) one or more media capabilities supported by the user's mobile computing device for delivering content to the user's mobile computing device based at least in part on media capabilities supported by the identified carrier, as described in carrier-specific embodiments in FIGS. 3-4 discussed below.

The discovery engine (130) may then generate a descriptor (135) associated with one of the detected media capabilities and store it in the database (140). The stored descriptor (135) may be associated with the richest of the detected media capabilities, for example.

In the delivery phase (105), the delivery engine (150) may retrieve the stored descriptor, and deliver content to the user's mobile computing device in accordance with the media capability associated with the stored descriptor (135). In an embodiment of the invention, the delivery engine (150) may retrieve content (145) stored in a format native to the delivery platform (120), and transform it to a favorable delivery format (165) tailored to the user's device based upon the information in the descriptor (135).

Figure 3:
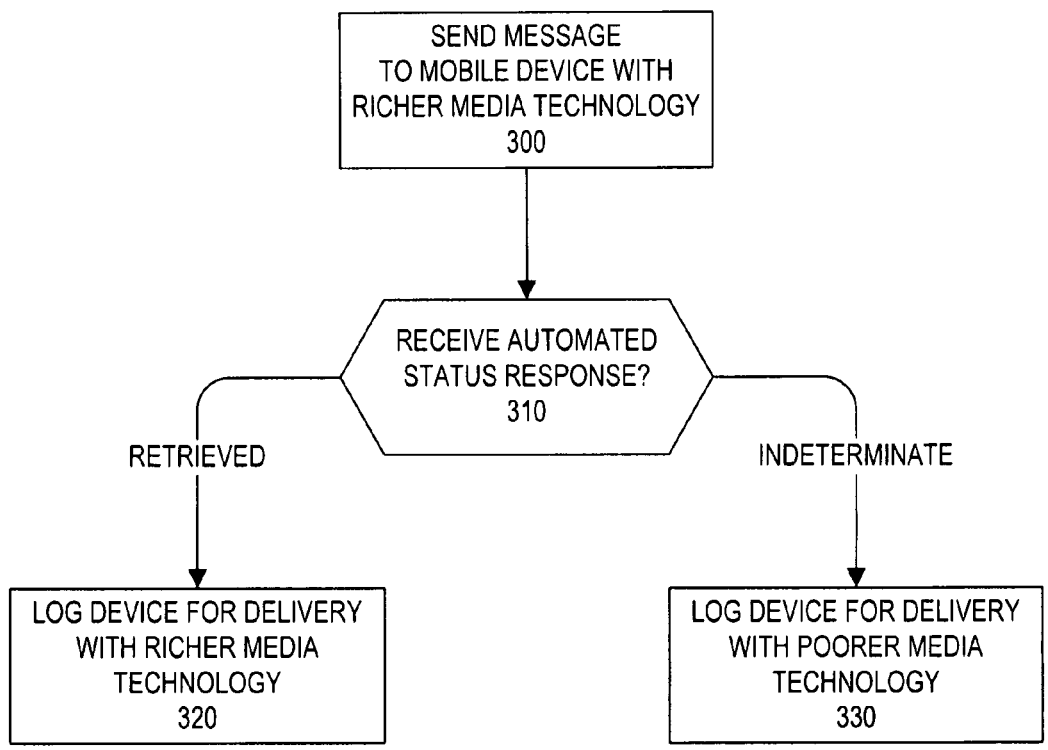
FIG. 3 is a flow chart that depicts a carrier specific process for detecting media capability of a mobile device in accordance with an embodiment of the present invention.

FIG. 3 is a flow chart that depicts a carrier specific process for detecting media capability of a mobile device in accordance with an embodiment of the present invention. For example, carrier "A" may be known to include only MMS support including images and txt, and not "out-of-garden" WAP pushes. In this situation, a richer media technology message, such as an MMS message, may be sent (step 300) to the user's mobile device. If an automated response (step 310) from the device is "Retrieved" (e.g., via an MMS delivery report), the discovery engine (130) may log (step 320) the device as "MMS Capable" in the database (140). If the MMS cannot be received by the device, a status message of "Indeterminate" would be received automatically by the engine (130), which would log (step 330) a status of indeterminate and indicate that the user (110) receive only poorer media technology content (e.g., SMS alert messages).

Figure 4:
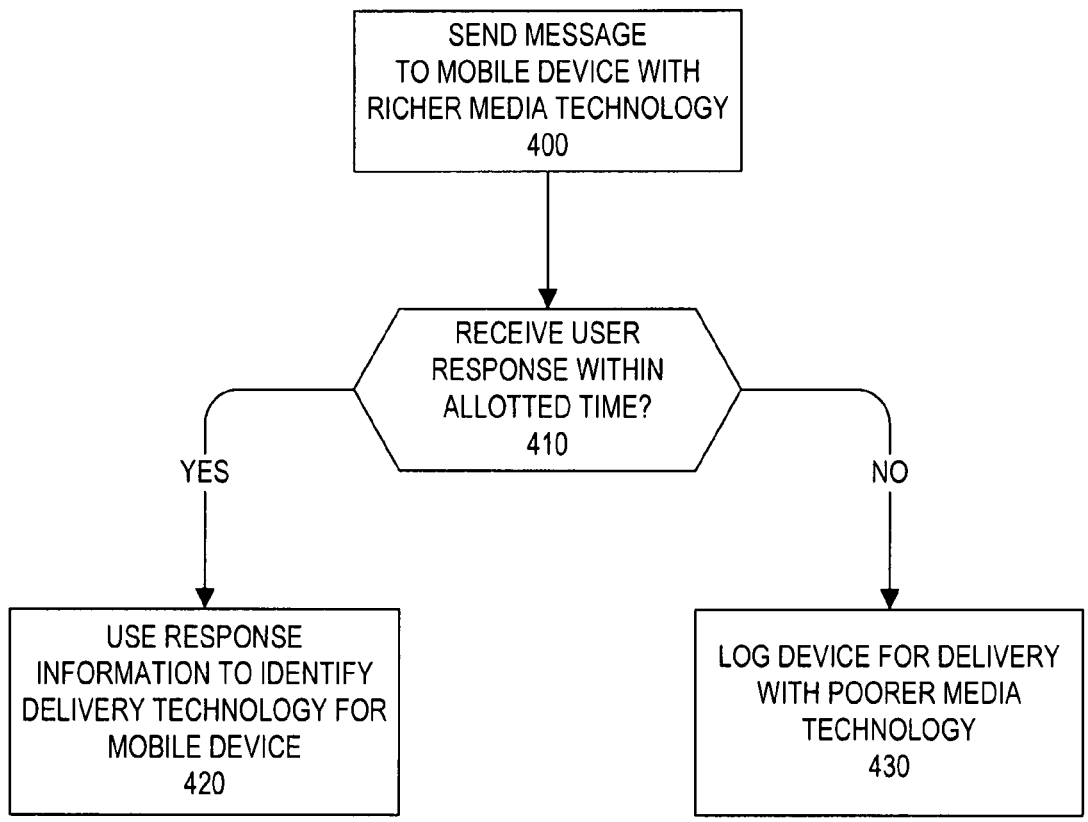
FIG. 4 is a flow chart that depicts another carrier specific process for detecting media capability of a mobile device in accordance with an embodiment of the present invention.

FIG. 4 is a flow chart that depicts another carrier specific process for detecting media capability of a mobile device in accordance with an embodiment of the present invention. For example, carrier "B" may be known to not support MMS, but to support "out-of-garden" WAP pushes. For users of carrier "B", WAP can be considered the media richest format for alert reception. The user (110) may be sent (step 400) a WAP Push message as well as a clickable SMS WAP link, for example. This is to obtain the highest response rate for those users that may be unfamiliar with their device's WAP deck. If the user (110) clicks (step 410) on either link (WAP Push or SMS) within an allotted timeframe (e.g., five minutes), the discovery engine (130) may use (step 420) this information to obtain device information (e.g., via HTTP header information, such as the "user-agent" field) and log the information into the database (140). If the user (110) does not respond to either WAP link within the allotted time, the database (140) may be updated (step 430) to reflect that they will receive only poorer media technology (e.g., SMS messages).

Preceding steps 300 and 400 in embodiments of the present invention in which the user (110) desires to subscribe to a content service provided by the platform (120), the discovery engine (130) may receive the mobile device identifier (112) from the user (110) via a web site, at which time the engine (130) may send a poorer technology message (e.g., SMS message) to the user's mobile device containing a PIN for verification purposes. When the user (110) provides verification by entering the PIN via the web site, steps 300 and 400 may follow. This also verifies to the platform that the user (110) understands how to use the poorer technology features of the mobile device.

In other embodiments, the process of the user (110) subscribing to a content service may originate from the user (110) entering a keyword and specific short code in the device and sending it to the device's carrier, which can operate in conjunction with the platform (120) to cause the further subscription steps described above to be carried out.

Figure 5:
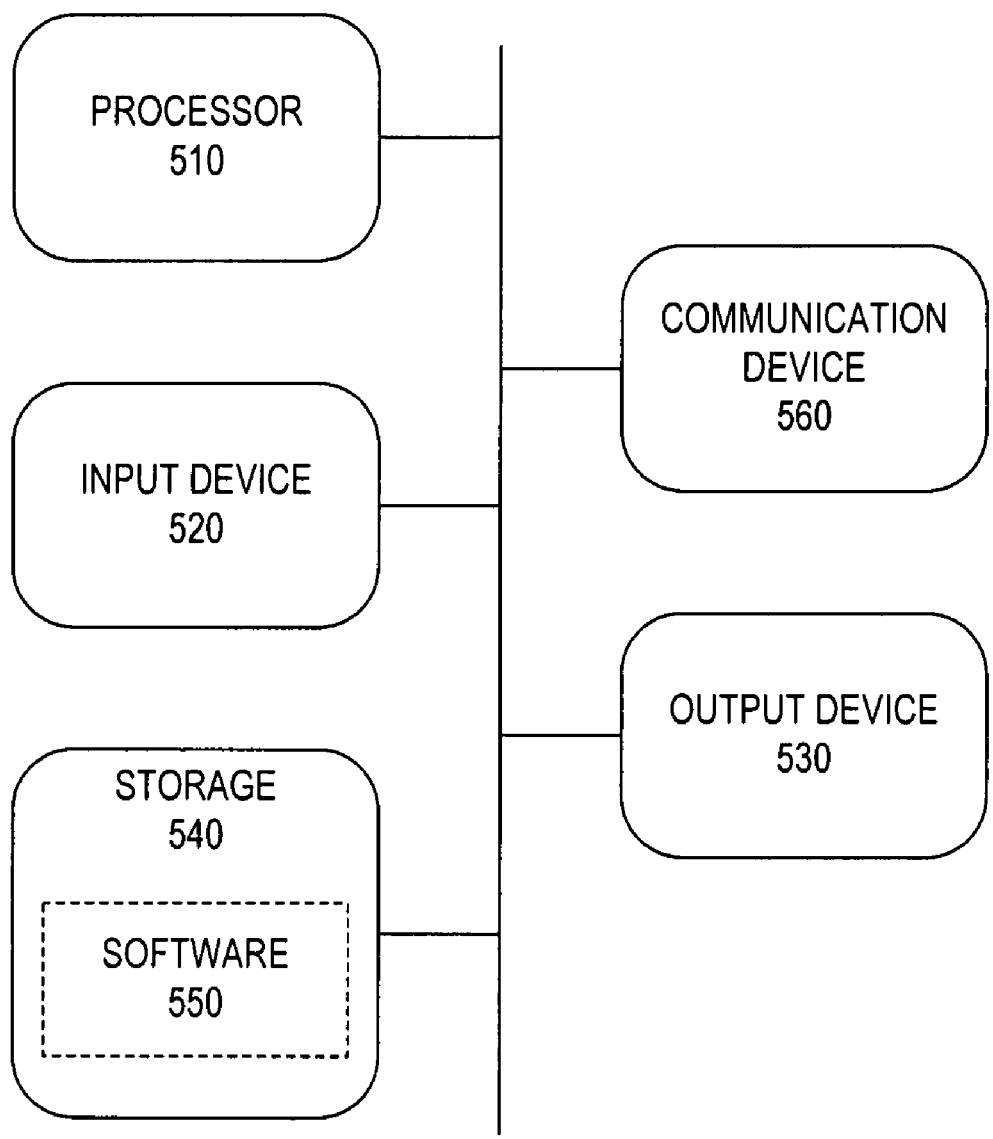
FIG. 5 is a block diagram that depicts a computing device in accordance with an embodiment of the present invention.

FIG. 5 illustrates the components of a basic computing device in accordance with an embodiment of the present invention, which may include a server running the discovery engine (130) or delivery engine (150), for example. The computing device may be a personal computer, workstation, server, or any other type of microprocessor-based device. The computing device may include one or more of a processor (510), input device (520), output device (530), storage (540), and communication device (560).

The input device (520) may include a keyboard, mouse, pen-operated touch screen or monitor, voice-recognition device, or any other device that provides input. The output device (530) may include a monitor, printer, disk drive, speakers, or any other device that provides output.

The storage (540) may include volatile and nonvolatile data storage, including one or more electrical, magnetic or optical memories such as a RAM, cache, hard drive, CD-ROM drive, tape drive or removable storage disk. The communication device (560) may include a modem, network interface card, or any other device capable of transmitting and receiving signals over a network. The components of the computing device may be connected in any manner, such as via electrical bus or wirelessly.

The software (550), which may be stored in the storage (540) and executed by the processor (510), may include, for example, the application programming that embodies the functionality of the present invention (e.g., as embodied in the discovery engine (130) and delivery engine (150)). The software (550) may include a combination of client applications and enterprise servers such as an application server and a database server.

Communications may occur over any type of network (115), which may implement any communications protocol, and which may be secured by any security protocol. Network links may include telephone lines, DSL, cable networks, T1 or T3 lines, wireless network connections, or any other arrangement that implements the transmission and reception of network signals.

The computing device may implement any operating system, such as Windows, Linux or UNIX. The software (550) may be written in any programming language, such as C, C++, Java, Visual Basic and/or SQL. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

For example, software functionality that implements the present invention, such as the discovery engine (130) and delivery engine (150), may comprise several discrete modules that together still provide the same functionality, data specified in the illustrated database (140) may be spread over several databases and/or systems, and the data and flow diagrams of FIGS. 1-4 may encompass combined steps or several intermediate steps that do not detract from the higher level functionality described therein.

What is claimed is:

1. A method for cross-carrier mobile device capability discovery, comprising:
   receiving an identifier associated with a mobile computing device of a user;
   identifying a wireless carrier network associated with the mobile computing device that serves the mobile computing device based on the received identifier;
   determining, with a content distribution system, media message protocol capabilities supported by the identified wireless carrier network, wherein each of the media message protocol capabilities of the identified wireless carrier network specifies that the identified wireless carrier network can deliver a message of a media message protocol corresponding to that media message protocol capability to the mobile computing device, each of the media message protocol capabilities offering a different richness of media support, wherein the media message protocol specifies a message format and a delivery mechanism of a message of that media message protocol, and the determining is accomplished by,
      transmitting a test message via the identified wireless carrier network to the mobile computing device of the user; and
   detecting one or more media capabilities supported by the user's mobile computing device for delivering content to the user's mobile computing device based at least in part on the media message protocol capabilities supported by the identified wireless carrier network and the test message sent to the mobile computing device of the user.

2. The method of claim 1, further including storing in a database a descriptor associated with one of the detected one or more media capabilities supported by the user's mobile computing device.

3. The method of claim 2, wherein the stored descriptor is associated with the richest of the detected one or more media capabilities.

4. The method of claim 2, further including retrieving the stored descriptor, and delivering content to the user's mobile computing device in accordance with the media capability associated with the stored descriptor.

5. The method of claim 1, wherein the mobile computing device of the user includes a phone capable of displaying content provided through the wireless carrier network.

6. The method of claim 1, wherein the identifier associated with the mobile computing device of the user includes a telephone number.

7. The method of claim 1, wherein the one or more media capabilities supported by the user's mobile computing device include one or more types of media displayable on the user's mobile computing device.

8. The method of claim 7, wherein the one or more types of media is selected from the group consisting of: text; combined image and text, combined video and text; and combined video, image, and text.

9. The method of claim 1, wherein the media message protocol capabilities supported by the identified carrier include one or more methods for delivering media to the user's mobile computing device.

10. The method of claim 9, wherein the one or more methods for delivering media is selected from the group consisting of SMS (Short Message Service), MMS (Multimedia Messaging Service), and WAP (Wireless Application Protocol).

11. The method of claim 1, wherein the message sent to the user's mobile computing device is sent in accordance with a richer of the media message protocol capabilities supported by the identified carrier.

12. The method of claim 11, wherein the detecting step further includes associating the descriptor with the richer media capability if an automated response is received indicating that he message was retrieved by the user's mobile computing device.

13. The method of claim 11, wherein the detecting step further includes identifying a make and model of the user's mobile computing device based on header information associated with a response to the message generated by the user.

14. A delivery platform server to deliver messages between users, the delivery platform server comprising:
   a processor;
   a discovery engine to receive an identifier associated with a mobile computing device of a user, the discovery engine to identify a wireless carrier network associated with the mobile computing device that serves the mobile computing device based on the received identifier and to determine media message protocol capabilities supported by the identified wireless carrier, wherein each of the media message protocol capabilities of the identified wireless carrier network specifies that the identified wireless carrier network can deliver a message of a media message protocol corresponding to that media message protocol capability to the mobile computing device, the each of the media message protocol capabilities offering a different richness of media support, the media message protocol specifies a message format and a delivery mechanism of a message of that media message protocol, and the determining is accomplished by, transmitting a test message via the identified wireless carrier network to the mobile computing device of the user; and
   a stored descriptor identifying one or more media capabilities supported by the user's mobile computing, the stored descriptor based at least in part on the media message protocol capabilities supported by the identified wireless carrier network and a the test message sent to the mobile computing device of the user.

15. The delivery platform server of claim 14, further comprising:
   a delivery engine to deliver the message, the delivery engine determining whether a response was received in response to the message.

16. The delivery platform server of claim 14, wherein the stored descriptor is associated with the richest of the detected one or more media capabilities.

17. The delivery platform server of claim 14, further comprising:
   a delivery engine to deliver a formatted message to the mobile computing device, the formatted message formatted in accordance with the stored descriptor indicating types of media, wherein the one or more types of media includes a combination of one or more of: audio, video, image and text.

18. A method for cross-carrier mobile device capability discovery, comprising:
   receiving an identifier associated with a mobile computing device of a user;
   issuing a carrier request to a look-up engine to determine an identity a wireless carrier network associated with the mobile computing device that serves the mobile computing device;
   receiving a response to the carrier request;
   identifying the wireless carrier network associated with the mobile computing device that serves the mobile computing device based on the received response to the carrier request;
   transmitting, with a content distribution system, a test message via the identified wireless carrier network to the mobile computing device of the user, the test message being of a media message protocol that is richer than plain text, wherein the media message protocol specifies a message format and a delivery mechanism of a message of that media message protocol;
   determining a response to the test message;
   determining, based on the response to the test message, media message protocol capabilities supported by the identified wireless carrier network, wherein each of the media message protocol capabilities of the identified wireless carrier network specifies that the identified wireless carrier network can deliver a message of a media message protocol corresponding to that media message protocol capability to the mobile computing device and each of the media message protocol capabilities offering a different richness of media support;
   detecting one or more media capabilities supported by the user's mobile computing device for delivering content to the user's mobile computing device based at least in part on the media message protocol capabilities supported by the identified wireless carrier network and the test message sent to the mobile computing device of the user.

* * * * *